J. B. LA PIERRE.
STEERING WHEEL.
APPLICATION FILED JAN. 28, 1921.
1,403,968.
Patented Jan. 17, 1922.
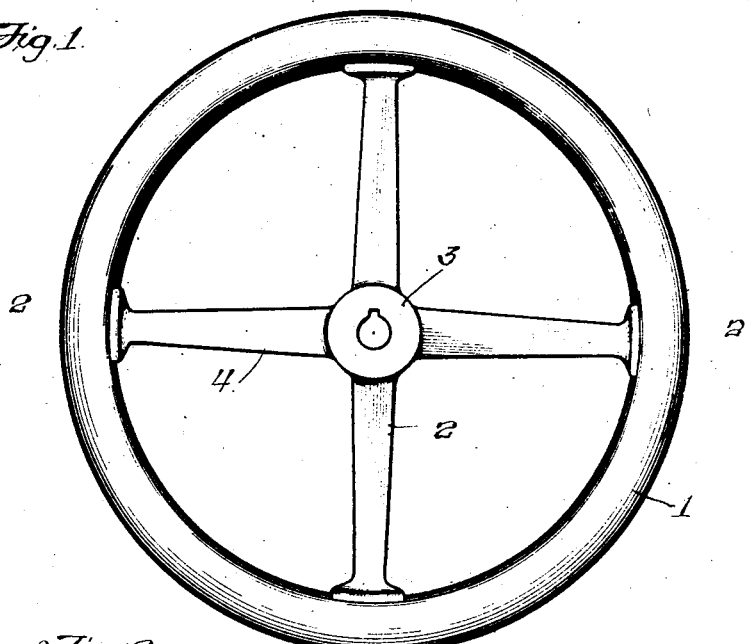
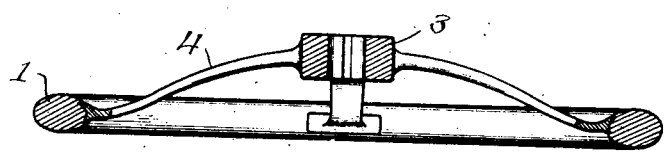
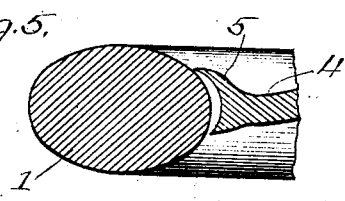
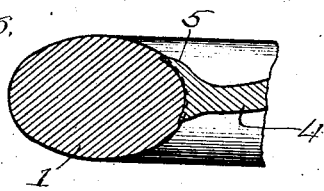
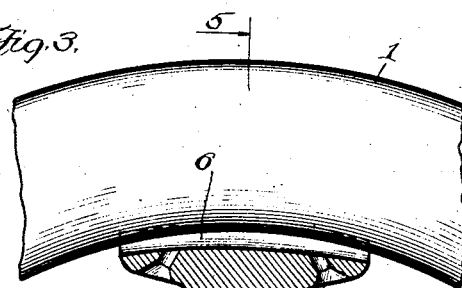
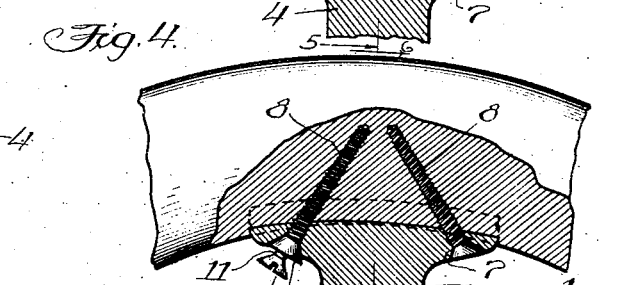

UNITED STATES PATENT OFFICE.

JULIAN B. LA PIERRE, OF CHICAGO, ILLINOIS.

STEERING WHEEL.

1,403,968.　　　　　Specification of Letters Patent.　　Patented Jan. 17, 1922.

Application filed January 28, 1921. Serial No. 440,576.

*To all whom it may concern:*

Be it known that I, JULIAN B. LA PIERRE, a citizen of the United States of America, and a resident of Chicago, county of Cook, and State of Illinois, have invented certain new and useful Improvements in Steering Wheels, of which the following is a specification.

This invention relates to steering wheels for motor driven vehicles and the like and particularly to the type of steering wheels in which a non-metallic rim is rigidly secured to the arms of a metallic spider.

In the construction of automobile steering wheels, it is desirable to produce an article which is ornamental in appearance and it is necessary that it also be of sufficient strength to withstand the strain and abuse to which it is likely to be subjected. It is also desirable that the connections between the spider arms and rim be such that the rim will be free from projections and patching and will present no obstruction to the free sliding movement of the hands around the wheel rim.

The main object of this invention is to provide an improved form and arrangement of parts for securing the ends of the spider arms to the rim without cutting away any part of the rim.

An illustrative embodiment of this invention is shown in the accompanying drawings, in which—

Fig. 1 is a plan of the steering wheel.

Fig. 2 is a transverse section on the line 2—2 of Fig. 1.

Fig. 3 is a fragmentary view, partly in section, showing one of the spider arms spaced away from the annular rim to show the differences in curvatures.

Fig. 4 is a view similar to Fig. 3, showing the parts in their assembled relation.

Fig. 5 is a section taken on the line 5—5 of Fig. 3.

Fig. 6 is a section taken on the line 6—6 of Fig. 4.

The steering wheel comprises an annular non-metallic rim 1 which is rigidly secured to a metallic supporting spider 2 having a hub 3 and a plurality of radially disposed arms 4.

The outer ends of the arms 4 are formed to provide pads 5 integral with the spider and having bearing surfaces 6 which bear against and firmly grip the annular rim at regular intervals along its inner periphery. In order to conform to the shape of the rim at the points of connection, so as to insure tight-fitting joints, the bearing surfaces 6 are curved longitudinally in the plane of the wheel and also transversely thereto. The radius of the longitudinal curvature is greater than the inner radius of the wheel, as shown in Figs. 3 and 4, and the transverse curvature has a radius which is less than the radius of a cross-section of the annular rim. For the sake of clearness, the transverse curvature is shown exaggerated in Figs. 5 and 6. These differences in curvatures permit the knife-like edges of the pads to bite into and become slightly embedded in the non-metallic rim so that the entire joint presents a smooth and ornamental appearance.

In order to permit a free and an unobstructive sliding movement of the driver's hands around the rim, and also to facilitate assemblage of the wheel, the oblong pads are so formed that the upper longitudinal biting edges are farther removed from the plane of the spider arms than the lower edges and, therefore, when the wheel is assembled the centers of the pads will be above the medial plane of the rim although the lower biding edges of the pads will extend below such plane, as shown in Figs. 5 and 6, so as to securely hold the rim.

A pair of counter-sunk apertures 7 extend through each of the pads on opposite sides of the spider arm to receive screws 8 which provide additional means for securing the rim to the spider. The crews in each pad extend into the rim at an angle to each other to increase the strength of the joint. The screws 8, as shown in Fig. 4, are preferably formed with two heads 9 and 10 connected by a narrow neck 11. The lower head is shaped so as to completely fill the countersink and the outer head 10 has the usual slot to accommodate a screw driver. Each of the screws is forced into the rim until the inner head 9 becomes seated in the countersunk aperture. By means of a cutting tool, or by the twisting of the neck through a continued effort to turn the screw after it becomes seated, the outer head is sheared off and the inner head may then be filed or ground down and polished so as to be flush with the face of the pad.

In assembling the wheel the rim is placed in a suitable support, not shown, having suitable lining to prevent marring of the finish, and the spider is placed in a press, whereby its arms are flexed enough to allow it to be inserted into place within the rim. Then the press is operated to force the spider arms outwardly so as to bring the pads into engagement with the rim. The pressure causes the sharp edges of the pads to become embedded in the softer material of the rim. The screws 8 are then inserted to permanently secure the pads to the rim.

Although but one specific embodiment of this invention is herein shown and described it will be understood that numerous details of the construction shown may be altered or omitted without departing from the spirit of this invention as defined by the following claims.

I claim:

1. A steering wheel comprising a rim in combination with a spider having a plurality of supporting arms, and pads formed on the ends of said arms to engage said rim, the bearing surface of each of said pads being concave and its marginal edges being forced into the material of the rim.

2. A steering wheel comprising a rim in combination with a spider having a plurality of supporting arms, and pads formed on the ends of said arms to engage said rim, the bearing surface of each of said pads being curved longitudinally in the plane of said wheel and also transversely thereto, the radius of said longitudinal curvature being greater than the inner radius of said rim, said transverse curvature having a smaller radius than that of the adjacent part of said rim, the marginal edges of said pads being forced into the material of the rim without having any of the rim material removed to provide seats for the pads.

3. A steering wheel comprising a rim in combination with a spider having a plurality of supporting arms, and pads formed on the ends of said arms to engage said rim, the bearing surface of each of said pads being concave and its marginal edges being forced into the material of the rim and extending on opposite sides of the medial plane of said rim, the bearing surface above said plane being greater than the surface below said plane.

4. A steering wheel comprising a rim in combination with a spider having a plurality of supporting arms, and pads formed on the outer ends of said arms to engage the inner periphery of said rim, said pads being secured against said rim by pressure produced through flexing said spider arms to bring said pads within said rim and then forcing said pads outwardly against the rim, and the marginal edges of the pads being sharpened so as to become embedded into the material of the rim.

Signed at Chicago this 25 day of Jan. 1921.

JULIAN B. LA PIERRE.